Patented Nov. 18, 1952

2,618,625

UNITED STATES PATENT OFFICE 2,618,625

RESINS STABILIZED WITH ORGANOTIN-SULFONAMIDES

Gerry P. Mack, Jackson Heights, and Emery Parker, New York, N. Y., assignors to Advance Solvents & Chemical Corporation, New York, N. Y.

No Drawing. Application August 9, 1949,
Serial No. 109,408

7 Claims. (Cl. 260—45.75)

1

The invention relates to stabilized polyvinyl chloride and compositions containing the same.

It is well known that vinyl chloride resins and resins formed by conjoint polymerization of vinyl chloride with vinyl acetate or other polymerizable compounds are liable to discoloration when subjected to elevated temperatures during or after compounding and also under the influence of prolonged exposure to light. A great number of stabilizers has been proposed for preventing or retarding such discoloration, also organo-tin compounds of which the effectiveness is generally attributed to their ability of binding the hydrochloric acid liberated during the decomposition of the resin.

However, the attempts of taking advantage of the stabilizing properties of organo-tin compounds have met with considerable difficulties due to the fact that the organo-tin compounds available heretobefore for this purpose have certain objectionable properties which reduce their value as stabilizer and affect the quality of the finished resin in various respects.

Many of said organo-tin compounds which are compatible with polyvinyl chlorides have such a high vapor pressure that when employed at the usual processing temperatures of 300–350° F. much of the stabilizer will volatize off and be lost. These stabilizers will therefore give a varying degree of stabilization depending on the temperature of the mill and on the operating conditions. This volatilization will continue during the calendering or extruding, so that eventually only a small amount of the original stabilizer will be present.

A further drawback of such volatile alkyl tin compounds employed as stabilizers is that their volatilization during processing causes ill effects on the health of the workmen working around the machinery and makes the work very disagreeable.

A particular disadvantage of many organo-tin compounds which would otherwise be satisfactory stabilizers is their instability to moisture and air which they often maintain even when incorporated in the resins. Therefore, their presence in resins increases the water sensitivity thereof and it is difficult to store and ship such stabilizers unless they are kept under vacuum, which is of course not feasible. It is known that such compounds immediately upon exposure to air will start changing and that they hydrolyze even under relatively low humidity forming copious precipitates; such precipitates are very difficult to disperse in vinyl resins and give opaqueness to the films rather than the clarity and transparency

2 so much desired in using the tin compounds as stabilizers.

Another drawback of the known stabilizers is that they are frequently not compatible with certain plasticizers used in the compounding of vinyl resins.

It is an object of this invention to provide vinyl chloride compositions stabilized with new organotin compounds which have a low vapor pressure and are stable against moisture, and which prevent discoloration and haziness of the resin during the processing as well as in the finished product, such as films, sheets, or molded articles, when exposed to heat and light.

Another object of the invention is to provide stabilizers which act at the same time as plasticizers.

Other objects and advantages will be apparent from a consideration of the specification and claims.

We have found that organo-tin sulfonamides of the general formula:

$$R_xSn(R'NO_2SR'')_y$$

are excellent stabilizers for vinyl chloride compositions.

In said formula, which designates dialkyl and trialkyl tin sulfonamides, R represents an alkyl radical having 1 to 12 carbon atoms or an aryl radical, R' represents hydrogen, an alkyl or aryl radical, and R'' is an alkyl or aryl, or alkylated aryl radical; $x$ is 2 or 3, and $y$ is 2 for $x=2$ and 1 for $x=3$.

The dialkyl and trialkyl tin sulfonamides are, depending on the sulfonamide and the dialkyl tin compound used, odorless and colorless solids or viscous liquids of very low vapor pressure and are stable against moisture and air. They are soluble, not only in hydrocarbons, esters, and similar conventional solvents but also in a number of high boiling esters used as plasticizers, such as dibutyl phthalate, di 2-ethyl hexyl phthalate, butoxyethyl adipate, and many others; therefore they can be readily incorporated in vinyl halide resins with which they are fully compatible.

An advantage of the new stabilizers is that they act at the same time as plasticizers so that the amount of plasticizer used for compounding the resin can be reduced by the amount of stabilizer added without changing the mechanical properties of the resin.

In explanation of the effect of organo-tin compounds a current hypothesis assumes that their stabilizing action is associated with a certain decomposition which liberates the organic compound linked to the alkyl tin complex. However this may be, it is an observed fact that most tin stabilizers split off, to a certain extent, a component during compounding and that such decomposition takes place also in the finished resin when subjected to severe conditions of heat and light. It is for this reason that many of the proposed tin compounds have not brought a satisfactory solution of the stabilizing problem because they are liable to split off components which are water soluble or incompatible with the resin, or which give off obnoxious odors or have other objectionable properties.

It is a particular advantage of the new stabilizers that when they decompose they split off sulfonamides which are fully compatible with the resin and have no objectionable effects thereupon. On the contrary, they remain useful components of the resin composition because they act of themselves as plasticizers.

The dialkyl and trialkyl sulfonamides may be prepared by causing an alkali or an alkaline earth metal derivative of a sulfonamide to react with a dialkyl tin dihalide or with a trialkyl tin monohalide, respectively. To carry out this reaction, the sulfonamide derivative is dispersed in an organic liquid, e. g. in an aromatic hydrocarbon which is a solvent for the dialkyl tin dihalide and the formed organo-tin compound but does not take part in the reaction.

After completion of the reaction, the precipitated alkali or alkaline earth metal halide is filtered off and the formed dialkyl or trialkyl tin sulfonamide is recovered from the solvent. The presence of water in this reaction is undesirable, as it will remove the halogen from the organo-tin halide and form an organo-tin oxide, which does not react.

Alkali metal derivatives of sulfonamides may be prepared by reacting the sulfonamide with metallic sodium or potassium, or with an alkoxide of a low molecular weight alcohol, such as methanol or ethanol, and by subsequently removing the alcohol, though in some cases such removal is not necessary. Another method of preparation consists in subjecting the mixture of an alkali hydroxide and sulfonamide to azeotropic distillation.

Aliphatic or aromatic sulfonamides may be used such as methyl, ethyl, butyl, hexyl, dodecyl, benzene, p-toluol, alpha and beta naphthalene sulfonamide.

Also, alkylated aromatic sulfonamides may be used where one or more alkyl groups are attached to the aromatic nucleus, or aliphatic sulfonamides where one hydrogen of the amino group is replaced by an alkyl or aryl residue. Such sulfonamides result from the reaction between an aliphatic or aromatic sulfochloride and a primary amine. Examples are: N-ethyl methane sulfonamide, N-butyl hexane sulfonamide, N-butyl benzene sulfonamide, N-ethyl p-toluolsulfonamide, N-benzyl butyl benzene sulfonamide, N-isopropyl dodecyl benzene sulfonamide, and others. Dialkyl tin dihalides suitable for the reaction with the alkali or alkaline earth metal sulfonamides are for instance dimethyl, diethyl, dipropyl, dibutyl, diamyl, dioctyl, dilauryl tin dichloride or the corresponding dibromides.

Resins which are made heat and light resistant by the stabilizer of the invention include polymers of vinyl chloride; copolymers of vinyl chloride with vinyl esters of aliphatic acids, particularly vinyl acetate; copolymers of vinyl chloride with esters of acrylic and methacrylic acids and with acrylonitrile; copolymers of vinyl chloride with diene compounds and unsaturated dicarboxylic acids or their anhydrides, such as copolymers of vinyl chloride with diethyl maleate, diethyl fumarate or maleic anhydride; after-chlorinated polymers and copolymers of vinyl chloride; conjoint polymers of vinyl chloride with vinylidene chloride and chlorobutadiene; polymers of vinyl chloro acetate and dichloro divinyl ether; chlorinated polymers of vinyl acetate; and mixtures of the polymers recited herein with each other or other polymerizable compounds. The corresponding bromides and brominated products are equally well stabilized.

The amount of organo-tin sulfonamide used as stabilizer will range between .5 to 10 per cent by weight of the resin mix.

The organo-tin sulfonamides may also be used in combination with other organo-tin compounds or organic substances having stabilizing properties.

It will be apparent that the compounds employed as stabilizers in my invention may also be used to stabilize other halogen-containing resins and rubber-like products, for instance polymers and co-polymers of vinylidene chloride; chlorinated polymeric esters of acrylic and alpha-substituted acrylic acids; polymers of chlorinated styrenes, for instance dichlorostyrene; chlorinated rubber; chlorinated polymers of ethylene; polymers and after-chlorinated polymers of chlorobutadienes, and their co-polymers with vinyl chloride; rubber hydrochloride and chlorinated rubber hydrochloride. The corresponding bromides and brominated products are equally well stabilized.

The following examples will illustrate the preparation of the stabilizers and their use in the compounding of vinyl resins.

*Example 1*

68.4 g. of para-toluosulfonamide, 16.4 g. of caustic soda dissolved in 16 cc. of water and 300 cc. of xylol were refluxed until the theoretical amount of water was separated; the batch was then cooled under rapid stirring to disperse the sodium derivative of the para-toluolsulfonamide, which is insoluble in xylol. 60.8 g. of dibutyl tin dichloride dissolved in 60 cc. of xylol were then slowly added at 0° to 5° C. and the batch was stirred until neutral. To facilitate the removal of the sodium chloride formed, the batch was heated to 60–70° C. and filtered by suction. A clear yellowish solution was obtained from which the xylol was removed by vacuum distillation. The product so obtained contained 19.35% of tin and consisted predominantly of the dibutyl di para-toluolsulfonamide tin of the formula:

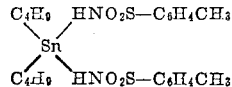

which contains theoretically 20.7 per cent of tin. 1 g. of this product was dissolved in 30 g. of dioctyl phthalate and milled on a rubber mill with 65 g. of a vinyl chloride-vinyl acetate copolymer resin having 95 per cent of vinyl chloride and 5 per cent of vinyl acetate with an intrinsic viscosity of 1.53 for 10 minutes at 320° F. until a uniform film was obtained. This film was then pressed between chrome plated steel plates for 5 minutes to smooth sheets of ¼" thickness. The sheets so produced were transparent and completely colorless and remained colorless and transparent when baked in a forced draft oven at 165° C. for 30 minutes and were only slightly yellowish after a baking which lasted for 45 minutes.

*Example 2*

64 g. of N-butyl benzenesulfonamide, 12.6 g. of caustic soda pellets dissolved in 12 cc. water and 1200 cc. xylol were refluxed and treated in a similar manner as in the preceding example. The sodium derivative of the N-butyl benzene sulfonamide was then reacted with 45.6 g. of dibutyl tin dichloride; after the batch became neutral, the salt was filtered off and the solvent distilled at 130° C. at 8 mm. pressure. A clear yellowish oil was obtained which corresponded to the formula

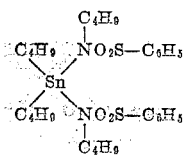

1.3 g. of this product were dissolved in 35 g. of dioctyl phthalate and incorporated in a vinyl resin solution containing 100 g. of polyvinyl chloride in 700 g. of a butylacetate-acetone mixture. From this solution films were cast which after complete air drying were heat treated for 45 minutes at 165° C. without a sign of discoloration. Other swatches of the same film were exposed to the ultra-violet in a standard Atlas fadeometer for a period of 550 hours without any visible breakdown.

*Example 3*

33 g. of n-hexane sulfonamide were added to a solution of 4.6 g. of sodium metal in 160 cc. of absolute methanol under cooling at 10° C. To this solution 30.4 g. of dibutyl tin dichloride dissolved in 40 cc. of methanol was added at 5–10° C. and the mixture was stirred until it became neutral. The salt was filtered off and the methanol removed under reduced pressure. The product obtained was a viscous liquid and contained predominantly the dibutyl di n-hexane sulfonamido tin of the formula

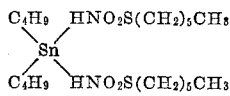

The crude product so obtained contained traces of methanol and chlorine possibly bound to the organic tin molecule. 1 part of the above described hexanesulfonamide derivative of dibutyl tin was milled continuously for 40 minutes with 100 parts of a joint polymer resin containing about 90 per cent of vinyl chloride and 10 per cent of diethylmaleate together with 40 parts of dioctyl adipate on a rubber mill at 350° F. No significant discoloration took place, whereas a similar mix without stabilizer assumed a reddish brown color.

*Example 4*

In an analogous manner, as described in the first example, dibutyl tin di-benzene sulfonamide was prepared having the formula

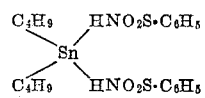

The crude product obtained after removing the solvent was purified by extraction with ether, then recrystallized from hot toluene. The product obtained was analyzed and contained:

|  | theory | found |
|---|---|---|
| Tin | 21.55 percent | 21.7 percent. |
| Nitrogen | 5.13 percent | 4.98 percent. |

The melting point was 135–137° C.

3 g. of the xylol solution, as obtained after filtering off the salt and concentrating the xylol solution under reduced pressure, which contained about 1 g. of dibutyl di-benzene sulfonamido tin was diluted with 27 g. of xylol; 20 g. of dioctyl phthalate and 50 g. of polyvinyl chloride were added to this solution; the whole mix was put in a ball mill and milled for 40 hours continuously. The resin paste obtained was coated on a cotton cloth, thoroughly dried to evaporate the solvent and then fused at 165° C. until a smooth uniform coating was obtained. The coating was clear and colorless. Swatches of this coated textile material were exposed to the ultraviolet light in a standard fadeometer for 500 hours without any visible sign of breakdown. Other swatches were embossed by pressing them between steel plates at 165–170° C. without changing the color and transparency of the coating.

*Example 5*

The sodium derivative of N-ethyl p-toluolsulfonamide, prepared by an azeotropic distillation of 39.8 g. N-ethyl p-toluolsulfonamide with 8 g. of sodium hydroxide in 200 cc. xylol was reacted under cooling with 65 g. of tributyl tin monochloride until the reaction became neutral. After filtering off the salt formed in the reaction, the solvent was removed under reduced pressure and the liquid tin derivative fractionated. The fraction boiling at 200° C. at 1.5 mm. was a clear colorless liquid which on analysis gave the following results:

|  | found | theory |
|---|---|---|
|  | Percent | Percent |
| Sn | 24.18 | 24.3 |
| N | 2.80 | 2.87 |

It corresponded to the formula

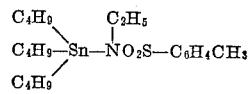

0.95 g. of this compound were milled with a mixture of 65 g. of vinyl chloride-acetate copolymer, being composed of 95 per cent of vinyl chloride and 5 per cent of vinyl acetate, and 35 g. of dioctyl phthalate on a rubber mill for 10 min. at 325–335° F. Sheets of this material were pressed between chrome plated plates for 30 min. at 335° F. and then placed in a forced-draft oven at 160–165° C. for 30 min. Only a very slight discoloration was observed whereas samples similarly treated but without stabilizer assumed a dark color.

In the examples we have shown alkyl tin sulfonamides as stabilizers because the alkyl tin halides are more readily available in commerce as a starting material than the corresponding aryl tin halides. We have found, however, that aryl tin sulfonamides, such as di or tri phenyl, benzyl, tolyl, xylyl, and similar tin sulfonamides have the same stabilizing action and can be used in the same way as alkyl tin sulfonamides.

Other uses and modifications of the invention will be apparent to those skilled in the art and are included within the scope of the invention as defined by the appended claims.

What we claim is:

1. A heat and light resistant plastic composition including as a major constituent a resin containing a polymeric vinyl halide composition and as a stabilizer an organo-tin compound of the formula $$R_xSn(R'NO_2SR'')_y$$

wherein R is a member of the group consisting of alkyl having 1 to 12 C atoms and aryl, R' is a member selected from the group consisting of hydrogen, alkyl and aryl, R'' is a member of the group consisting of alkyl, aryl, and alkylated aryl, and wherein $x$ plus $y$ is 4, $x$ being at least 2 and not higher than 3.

2. A heat and light resistant plastic composition as defined in claim 1, wherein the resin is a conjoint polymer of vinyl chloride with another polymerizable compound.

3. A heat and light resistant plastic composition as defined in claim 2 wherein the resin is essentially a conjoint polymer of vinyl chloride with vinyl acetate.

4. A heat and light resistant halogenated vinyl resin composition including intimately dispersed therein .5 to 10 per cent of a dialkyl tin disulfonamide wherein the alkyl group contains not more than 12 carbon atoms.

5. A heat and light resistant plastic composition containing at least 60 per cent of vinyl chloride and including intimately dispersed therein .5 to 10 per cent of a dialkyl tin disulfonamide wherein the alkyl group contains not more than 12 carbon atoms.

6. A heat and light resistant halogenated vinyl resin composition including intimately dispersed therein .5 to 10 per cent of a trialkyl tin sulfonamide wherein the alkyl group contains not more than 12 carbon atoms.

7. A heat and light resistant plastic composition containing at least 60 per cent of vinyl chloride and including intimately dispersed therein .5 to 10 per cent of a trialkyl tin sulfonamide wherein the alkyl group contains not more than 12 carbon atoms.

GERRY P. MACK.
EMERY PARKER.

REFERENCES CITED

The following references are of record in the file of this patent:

UNITED STATES PATENTS

| Number | Name | Date |
|---|---|---|
| 2,376,313 | Reiff | May 15, 1945 |
| 2,477,349 | Richard | July 26, 1949 |
| 2,479,918 | Fincke et al. | Aug. 23, 1949 |
| 2,484,508 | Hill | Oct. 11, 1949 |